United States Patent
Connolly et al.

(10) Patent No.: US 7,869,379 B2
(45) Date of Patent: *Jan. 11, 2011

(54) METHOD FOR MONITORING CHANNEL EYE CHARACTERISTICS IN A HIGH-SPEED SERDES DATA LINK

(75) Inventors: Brian J. Connolly, Williston, VT (US); Todd E. Leonard, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 634 days.

This patent is subject to a terminal disclaimer.

(21) Appl. No.: 11/750,870

(22) Filed: May 18, 2007

(65) Prior Publication Data
US 2008/0285443 A1 Nov. 20, 2008

(51) Int. Cl.
H04J 1/16 (2006.01)
G06F 11/00 (2006.01)

(52) U.S. Cl. .............. 370/252; 370/255; 370/213; 370/437; 714/48; 714/704

(58) Field of Classification Search ............. 370/230.1, 370/231, 235, 236, 419, 437, 465, 477; 714/47, 714/48, 49, 704, 750, 774
See application file for complete search history.

(56) References Cited

U.S. PATENT DOCUMENTS

| | | | |
|---|---|---|---|
| 5,325,397 A | 6/1994 | Scholz et al. | |
| 5,425,033 A | 6/1995 | Jessop et al. | |
| 5,652,760 A | 7/1997 | Yamashita et al. | |
| 5,699,365 A | 12/1997 | Klayman et al. | |

(Continued)

FOREIGN PATENT DOCUMENTS

JP 08223107 8/1996

(Continued)

OTHER PUBLICATIONS

InfiniBand Architecture Specification vol. 2, Release 1.2, pp. 102-103,133-134, 297-298.*

(Continued)

*Primary Examiner*—Chi H Pham
*Assistant Examiner*—Ahmed Elallam
(74) *Attorney, Agent, or Firm*—Scully, Scott, Murphy & Presser, P.C.; Michael J. LeStrange, Esq.

(57) ABSTRACT

A method is disclosed for tuning each channel of a high-speed SerDes cable link interface arranged in a configuration linking a local side physical layer to a remote side physical layer. The method includes initiating an operational state of high-speed SerDes cable link interface, identifying flow-control packet Op codes not cited for use by operational high-speed SerDes cable link interface, transmitting a flow control signal from the local side physical layer to the remote side physical layer to control the remote side physical layer to monitor the eye characteristics of the channels used by the local side physical layer to transfer data to the remote side physical layer, transferring eye characteristics acquired in the monitoring to the local side physical layer and processing the eye characteristics by the local side physical layer to generate equalization setting adjustments.

20 Claims, 2 Drawing Sheets

U.S. PATENT DOCUMENTS

Figure 1:
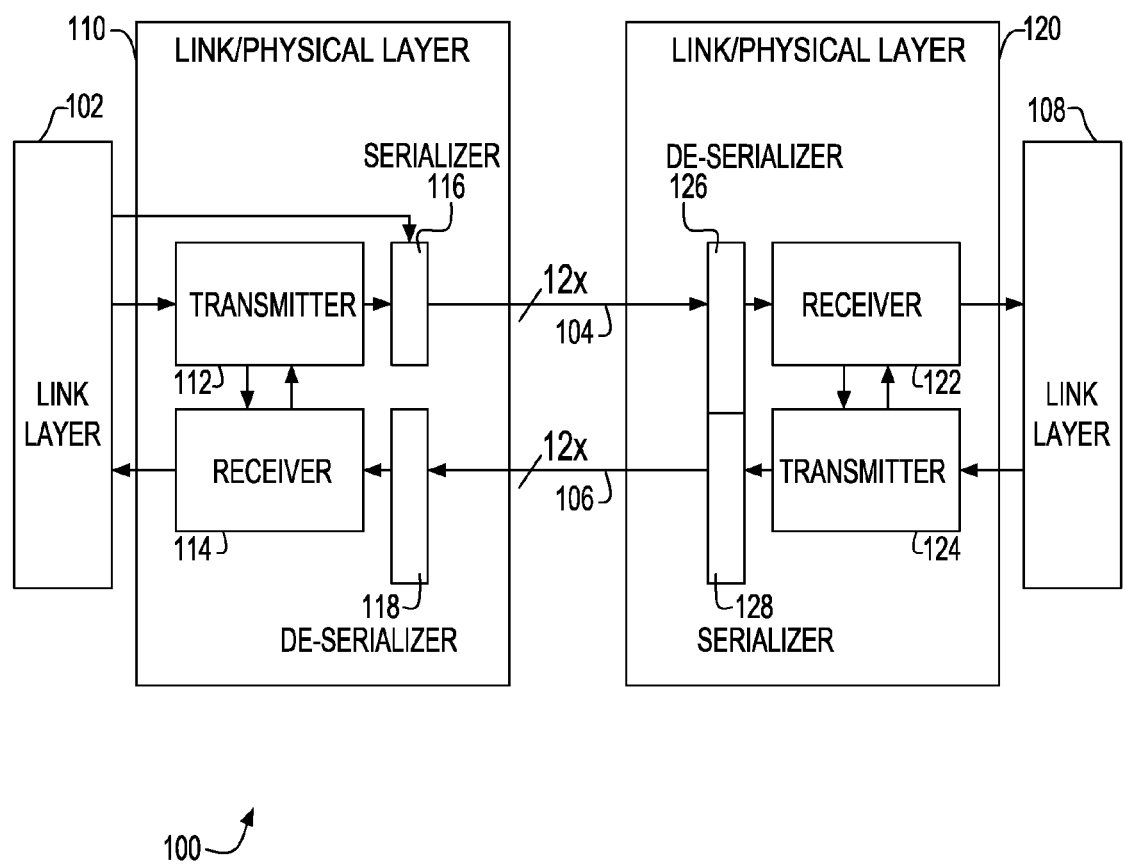

| | | | |
|---|---|---|---|
| 6,735,725 | B1 | 5/2004 | Wu et al. |
| 6,760,882 | B1 | 7/2004 | Gesbert et al. |
| 6,915,463 | B2 | 7/2005 | Vieregge et al. |
| 6,973,600 | B2 | 12/2005 | Lau et al. |
| 6,983,403 | B2* | 1/2006 | Mayweather et al. ....... 714/704 |
| 7,102,392 | B2 | 9/2006 | Hsu et al. |
| 7,295,618 | B2* | 11/2007 | Hsu et al. ................... 375/257 |
| 7,352,815 | B2* | 4/2008 | Camara et al. .............. 375/257 |
| 7,505,512 | B1* | 3/2009 | Anderson et al. ........... 375/229 |
| 2003/0120983 | A1 | 6/2003 | Vieregge et al. |
| 2004/0071219 | A1* | 4/2004 | Vorenkamp et al. ......... 375/257 |
| 2005/0123295 | A1* | 6/2005 | Hullin et al. .................. 398/25 |
| 2005/0163168 | A1* | 7/2005 | Sheth et al. .................. 370/537 |
| 2007/0127920 | A1* | 6/2007 | Ghiasi et al. .................. 398/25 |
| 2007/0206641 | A1* | 9/2007 | Egan .......................... 370/479 |
| 2007/0252735 | A1* | 11/2007 | Shi et al. .................... 341/118 |
| 2007/0258478 | A1* | 11/2007 | Wu et al. .................... 370/437 |
| 2008/0002761 | A1* | 1/2008 | Edsall et al. ................. 375/222 |
| 2008/0013609 | A1* | 1/2008 | Daxer et al. ................. 375/221 |
| 2008/0187033 | A1* | 8/2008 | Smith ........................ 375/228 |
| 2008/0192814 | A1* | 8/2008 | Hafed et al. ................. 375/224 |
| 2009/0245110 | A1* | 10/2009 | Connolly et al. ............ 370/236 |
| 2009/0257514 | A1* | 10/2009 | Connolly et al. ............ 375/257 |

FOREIGN PATENT DOCUMENTS

| | | |
|---|---|---|
| JP | 20002357 | 8/2000 |

OTHER PUBLICATIONS

"Eye Diagram Analysis Tool Persistence Histograms Measure Eye Diagram Statistics", LeCroy Applications Brief No. L.A.B. 734.

Shepard, "Evaluating oscilloscopes: Dig deeper", www.edn.com, Aug. 19, 2004, pp. 61-66.

"Modeling of Infiniband Cable Assembly from Measurements", Tektronix Enabling Innovation, www.tektronix.com/interconnect, pp. 1-10.

Ron Nikel and Hansel Collins, "Designing For Multi-Protocol SerDes: SFI, NPSI, SPI-4", analogZONE.

"High-Speed Random-Data Generator Facilitates Eye Diagrams", Dallas Semiconductor MAXIM, Feb. 1, 2005.

* cited by examiner

METHOD FOR MONITORING CHANNEL EYE CHARACTERISTICS IN A HIGH-SPEED SERDES DATA LINK

CROSS-REFERENCE TO RELATED APPLICATION

This application is related to U.S. patent application Ser. No. 11/750,846, filed concurrently herewith, entitled: "Method For Monitoring BER In An Infiniband Environment," and having a common assignee, which application is incorporated in its entirety.

BACKGROUND OF THE INVENTION

The present invention relates to monitoring a high-speed serializer-deserializer (SerDes) link, and more particularly relates to monitoring high-speed serializer-deserializer (SerDes) link channels to acquire a channel's eye patterns or eye characteristics, and adjusting link adaptive equalization settings, if possible, to realize improved link operation.

System architectures such as Infiniband and PCI Express utilize high-speed serializer-deserializer (SerDes) links to transmit data packets across serial links. These architectures are migrating to SerDes links that support link speeds at single data rates (SDR), double data rates (DDR) and quad data rates (QDR). In doing so, each architecture defines and provides for link-training methods that enable the high-speed SerDes link to support transmitting data at the higher data rates. One such architecture, Infiniband, provides for link operation at such higher data rates.

The Infiniband specification, Vol. 2, Rel. 1.2, supports adaptive equalization to compensate for signal distortion within link channels operating at the higher data rates. The Infiniband specification, section 5.6.4, Link Training State Machine, defines the procedure to enable adaptive equalization in an Infiniband system. The specification defines a 2 ms period to negotiate each side of a link's capabilities to support the SDR, DDR and QDR speeds. Once the negotiation process is completed, the Infiniband specification defines a 100 ms period to allow the default, or any of the 16 other possible (possibly available) adaptive equalization settings to be implemented across the entire link width, i.e., all of the link channels.

This solution is limited, however, in that one setting is selected for the entire link width (i.e., all of the channels). Link widths can be 1, 4, 8 and 12 channels wide using Infiniband, and up to 16 channels wide for PCI express. In an ideal system, every channel would be uniform and the above-mentioned method would be fine. In reality, however, this is hardly the case. That is, each medium or channel has it own set of impedance characteristics and tolerances. The Link Training State Machine method does not take into the account the varying characteristics between each channel. By limiting each channel to one set of adaptive equalization settings, some of the channels will not work optimally at DDR/QDR speeds. For example, at DDR/QDR speeds, real-time operation may find that only 8 channels out of the 12 available channels are operating effectively, which would result in a significant performance degradation for the entire link.

What would be desirable, therefore, is a new structure and process that allows for each channel within a high-speed Infiniband or PCI Express architecture to be independently monitored for optimal or less than optimal channel operation, in particular, the channel's eye opening, or eye patterns. Based on its monitored or detected eye characteristics, or eye pattern, the channel's adaptive equalization setting can modified where necessary (and if possible) to adjust the eye opening in the channel for improved channel processing.

SUMMARY OF THE INVENTION

To that end, the present invention provides a system structure and method that provides for monitoring the eye opening or eye characteristic pattern for each or any channel within an Infiniband or PCI Express link architecture independently. Based on the eye characteristics for the channel, the inventive system and method can then modify the channel's adaptive equalization settings so that the channel may better recover symbols and timing, i.e., minimize inersymbol interference within the channel. The channel eye characteristics allow the invention to determine whether adjustment of the channel's equalization settings will optimize the channel's operation. That is, using the observed or monitored eye characteristics allow the transmitting side to adjust the SerDes link coefficients, i.e., adaptive equalization settings, to control the shape of the channel.

In a preferred mode of operation, the eye characteristics for each of the link's channels are monitored individually, but not all channel data acquired during the monitoring need be used. That is, proper operation does not require that all monitored channel eye characteristics to be passed to the remote side of the link, but instead only one channel's eye characteristics determined by the receiver side to be representative of "best" operation. To accomplish this, undefined OP codes in the flow control packets are used to pass the eye characteristics, or parameters representative of same, for each lane back to the transmitting link. The eye characteristics include, for example, the 50% or 90% levels, a parameter indicative of a difference between high and low level of signals operation, eye peak, pulse shape and pulse shaping parameters, pre-emphasis, which is a parameter indicative of an amount that signals are amplified for transmission, and drive strength, which corresponds to slew rates (power settings) for a channel.

The transmit side of the link processes each lane's eye characteristics with a particularized function to determine if and how to best modify the transmitter (TX) settings at each lane, e.g., adjusting the equalization settings if the modification will improve the eye characteristic for the lane. Because the novel function would require a substantial period, that is, in excess of 4 ms, it would run in the background and be implemented at any time. The adaptive equalization process is used by the SerDes link hardware during link training, and is described in the Infiniband specification, Vol. 2, Rel. 1.2, as "looking" (monitoring) only for a 4 ms window. That is, the normal IB method for determining which of the 16 tests is the best includes looking at the eye characteristics for a 4 ms window when the link is in training. The need to discriminate is required because several tests may have the same eye opening over only 4 ms, so that data representing eye characteristics for each channel supports a determination of best test.

An inventive method for tuning high-speed SerDes cable link channels arranged to link a local side physical layer to a remote side physical layer includes a step of initiating an operational state of a high-speed SerDes cable link interface, a step of identifying flow-control packet op codes not cited for use by the operational high-speed SerDes cable link interface, and a step of transmitting a flow control signal from the local side physical layer to the remote side physical layer to control the remote side physical layer to monitor the eye characteristics of the channel at the monitoring. The channel eye characteristics, or parameters representative of same, are transferred to the local side physical layer. The local side physical layer processes the eye characteristics to determine whether modifying the equalization settings will improve the channels' or overall link's operation. Adjusting a channel's adaptive equalization settings may include adjusting for one of the power level of each channel and the coefficient setting for each channel, and modifying the equalization settings of each channel based on the generated equalization setting adjustments.

DESCRIPTION OF THE DRAWING FIGURES

Figure 2:
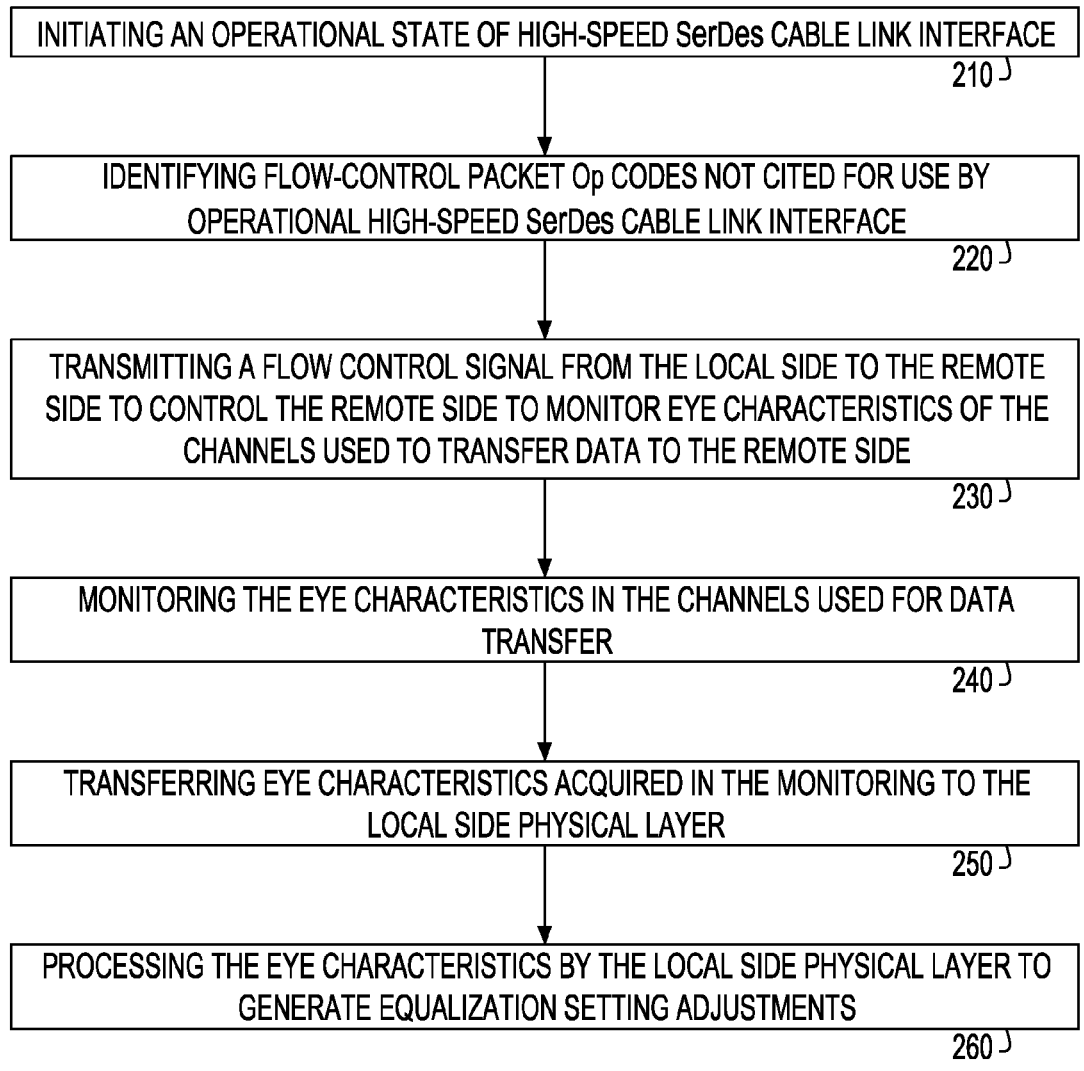

FIG. 1 is a system level diagram of a conventional Infiniband Link configuration 100 of the invention; and FIG. 2 is a schematic block diagram that depicts an inventive method for implementing improved all-channel high-speed SerDes operation of the invention.

DETAILED DESCRIPTION OF THE INVENTION

FIG. 1 is a system level diagram of an Infiniband Link configuration 100 within which an Infiniband embodiment of the invention is implemented. The reader and skilled artisan alike should realize that the FIG. 1 configuration is provided for exemplary purposes only, to explain the inventive principles, and that the invention may be implemented in any high-speed SerDes-based link architecture available, for example, PCI Express, without limitation. The invention may be implemented by modifying the said SerDes link architectures to use undefined OP codes in the flow control packets to pass each lane's eye characteristics to the transmitting link. At the transmitting link, a novel function processes the channel's eye characteristics to determine how to modify the transmitter settings and improve the lane's eye characteristics, and therefore its BER. Hence, the Infiniband example shown should not be implied as a limitation of the inventive scope in any way, particularly with respect to the invention as claimed.

FIG. 1 shows both the transmit (TX) or local side 110 of link 100, and the receiver (RX) or remote side 120 of the link. It should be noted that the convention used for the transmitter and receiver sides as shown is for exemplary purposes only, so that in any implementation, the local and remote link physical layers may be reversed. The transmitter (TX) side 110 is electrically connected to the TX device link layer, designated 102. The TX device link layer 102 connects to the TX side transmitter 112, TX side receiver 114, and TX side serializer 116. TX side receiver 114 receives data from TX side serializer 118, and provides the received data to the device link layer 102. The TX side serializer further connects to RX side deserializer 126 via Infiniband cable 104. An RX side serializer 128 connects to TX side deserializer 118 via Infiniband cable 106, and connects to RX side device link layer 108. The RX side deserializer 126 connects to RX side receiver 122, and the RX side serializer 128 connects to the RX side transmitter 124 (and the device link layer 108).

Operation of the novel high-speed SerDes architecture operation is as follows. Undefined OP codes in specified flow control packets are utilized by the invention to monitor the eye characteristics for all the active channels, and transfer monitoring data to control adjusting the channel or link operation, if possible. As used herein, eye characteristics, or parameters representative of eye characteristics, derive from a communication channel's operating characteristics. Eye patterns or diagrams are oscilloscope displays in which a digital data signal from a receiver is repetitively sampled and applied to the vertical input, while the data rate is used to trigger the horizontal sweep. Several system performance measures are derived by analyzing the eye pattern or display. If the signals observed in the eye diagram or pattern are too long, too short, poorly synchronized with the system clock, too high, too low, too noisy, too slow to change, or have too much undershoot or overshoot, the information may be derived from the eye pattern or characteristics. An open eye pattern corresponds to minimal signal or intersymbol distortion or interference, which would appear as closure of the eye pattern (displayed or observed).

Eye characteristics include the eye opening, pulse shape (symmetry), pre-emphasis of the data on the channel, relating to amplification of the transmit signal, and signal drive strength, relating to slew rate. Undefined Op codes are modified by a new function after the system has been configured for operation. That is, once the system operation is defined and known to be operable, the new function analyzes the defined flow control packets and determines what undefined op codes are available for use by the invention. Once known to be available, the op codes are used by the new function to define several different types of packets to support the eye characteristic monitoring of link channels. Inventive operation depends on the newly defined packets to implement the monitoring function at each of the channels or lanes, which are 12 in the embodiment depicted in FIG. 1.

A first packet is defined to initiate the inventive monitoring and adjustment function. That is, the inventive method includes using a first flow-control packet to setup or enable the monitoring portion of the function's operation. The first or setup packet includes the time interval in which the eye characteristics are collected (monitored) for a channel, and returned, includes which channels/lanes the eye characteristics are collected from, and includes the eye characteristics and related parameters for one or more of the link's channels. A second flow-control packet, referred to as an acknowledge packet, is generated to functionally acknowledge that the other side of the link will be able to perform (the function), e.g., that the receiver side can implement the monitoring. The acknowledge packet includes the same information as the setup packet. The acknowledge function is limited, however, to using an available OP code that is distinct from the OP code used by the setup packet. The third packet, or eye characteristics packet, is generated to pass back the channel's particular eye characteristics, or like parameters. The eye characteristics packet includes data indicative of the separation between the high and low signals, or eye opening, eye peak, eye symmetry, which relates to the pulse shaping during the channel's data transmission, signal drive strength, etc. The aforementioned eye characteristics are monitored in a lane during a fixed time interval during a transmission.

For Infiniband cable operation, the OP code field is defined at the following references:

7.9.4.1 FLOW CONTROL PACKET FIELDS 7.9.4.1.1 OPERAND (OP)—4 BITS

The flow control packet is a link packet with one of two Op (operand) values: an operand of 0x0 indicates a normal flow control packet; an operand value of 0x1 indicates a flow control initialization (init) packet.

C7-55: When in the PortState LinkInitialize, flow control packets shall be sent with the flow control init operand, 0x1.

C7-56: When in the PortStates LinkArm or LinkActive, flow control packets shall be sent with the normal flow control operand, 0x0.

C7-57: All other values of the Op field are reserved for operations that may be defined by Infiniband architecture (IBA) in the future. Any packet received with a reserved value shall be discarded.

Any Op code values other then 0 or 1 may be used. If the RX side device 108 that the transmit link 110 is attached to (through receiver link 120) does not support the function, then the packet would simply be discarded. Since the requesting or transmit link 110 would therefore not receive an acknowledge packet from the device link layer 108 (communicating through RX link 120), the transmit link 110 will realize that the RX side device cannot or does not support the function.

The following example highlights the novel operation. Where the transmitter side 110 wishes to fine-tune each of it's transmit channels for transmitting data to the receiver side 120, the transmitter side 110 first sends a flow control signal to the receiver side. At the receiver side 120, the flow control signal enables channel eye characteristic monitoring. More particularly, the flow control signal identifies what lanes or channels are to be monitored, as well as the time interval during which the monitoring is to take place. The time interval is preferably defined by a number of cycles that the eye characteristics for the channel should be collected (monitored). The Receiver side 120 sends the transmitter side 110 an acknowledge packet indicating what lanes and the number of cycles it will be collecting/monitoring eye characteristics.

At the periodic interval, the detected eye characteristics, e.g., eye opening information, are transmitted from the receiver side 120 to the transmitter side 110. The eye characteristics packet is deserialized in deserializer 118, received in TX side receiver 114, and then passed to the RX side link layer 102. Link layer 102 processes the eye characteristics and initiates action to modify the TX side SerDes equalization settings, adjusting for either power level or coefficient setting to control the channel's eye characteristics. The inventive link configuration and operation provides what is an essentially a closed loop system that feeds back the eye characteristics detected at the receiver side 120. With the eye characteristics, the transmitter side 110 is able to adjust channel and/or link operation accordingly.

FIG. 2 sets forth a method 200 for tuning each channel of a high-speed SerDes cable link interface arranged in a configuration linking a local side physical layer to a remote side physical layer. Method 200 includes a step of initiating an operational state of high-speed SerDes cable link interface, as indicated by block 210. Block 220 represents a step of identifying flow-control packet Op codes not cited for use by operational high-speed SerDes cable link interface. Block 230 represents a step of transmitting a flow control signal from the local side physical layer to the remote side physical layer to control the remote side physical layer to monitor the eye characteristics of the channels used. A step represented by block 240 includes monitoring the eye characteristics in the channels used for data transfer (by the remote side physical layer). A block 250 represents a step of transferring eye characteristics acquired in the monitoring to the local side physical layer. Block 260 represents a step of processing the eye characteristics by the local side physical layer to generate equalization setting adjustments. The step of processing to generate equalization setting adjustments preferably includes adjusting for one of the power level of each channel and the coefficient setting for each channel.

The inventive method preferably includes a step of modifying the equalization settings of each channel based on the generated equalization setting adjustments. The flow control signal defines the channels to be monitored by the remote side physical layer, and the number of cycles for which the eye characteristic monitoring is carried out. The flow control signal is preferably included in a setup packet. After receiving the setup packet, the remote side physical layer responds by forwarding back an acknowledge packet within which the remote side physical layer provides acknowledgement that it will carry out the monitoring and collecting for the channels identified. After monitoring, the remote side forwards an eye characteristics packet within which the remote side physical layer includes the eye characteristics collected. Each packet is preferably generated using a separate op code.

Although a few examples of the present invention have been shown and described, it would be appreciated by those skilled in the art that changes may be made in these embodiments without departing from the principles and spirit of the invention, the scope of which is defined in the claims and their equivalents.

The invention claimed is:

1. A method for tuning a high-speed SerDes cable link arranged in a configuration linking a local side physical layer to a remote side physical layer, comprising the steps of:
   initiating an operational state of the high-speed SerDes cable link;
   identifying flow-control packet Op codes available for monitoring at least one link channel in the high-speed SerDes cable link;
   transmitting a flow control signal from the local side physical layer to the remote side physical layer to monitor eye characteristics for each link channel;
   transferring eye characteristic data for each link channel to the local side physical layer; and
   processing the eye characteristic data at the local side physical layer to generate equalization setting adjustments for an individual link channel in the high-speed SerDes cable link where said eye characteristic data indicates interference in the link channel.

2. The method for tuning as set forth in claim 1, wherein the step of processing includes adjusting one of: a power level of each link channel and a coefficient setting for each link channel.

3. The method for tuning as set forth in claim 1, further comprising monitoring bit error rate (BER) in the link channels used for data transfer, transferring bit error rate data to the local side physical layer and processing the BER data to further support said equalization setting adjustments.

4. The method for tuning as set forth in claim 1, wherein each link channel is monitored for a fixed time period.

5. The method as set forth in claim 1, wherein each link channel is monitored for a variable time period.

6. The method for tuning as set forth in claim 1, wherein the step of transmitting the flow control signal includes identifying the link channels to be monitored and a number of cycles the monitoring is carried out.

7. The method for tuning as set forth in claim 1, wherein the step of identifying further comprises:
   generating a setup packet that defines the interval in which link channels are to be monitored, and eye characteristics collected by the remote side physical layer, and the link channels for which the monitoring is to be conducted.

8. The method for tuning as set forth in claim 7, wherein the step of identifying further includes generating an acknowledge packet within which the remote side physical layer provides acknowledgement to the local side physical layer that it will carry out the monitoring and collecting for the link channels identified.

9. The method as set forth in claim 8, wherein the step of identifying further includes generating an eye characteristics packet within which the remote side physical layer includes the collected eye characteristics or eye characteristic data.

10. The method as set forth in claim 8, wherein each packet is generated using a separate op code.

11. The method as set forth in claim 9, wherein each packet is generated using a separate op code.

12. The method as set forth in claim 1, wherein an op code value may be used that is other than 0 or 1.

13. A program storage device readable by machine, tangibly embodying a program of instructions executable by the machine to perform method steps for tuning each channel of a high-speed SerDes cable link interface arranged in a configuration linking a local side physical layer to a remote side physical layer, comprising the steps of:
  initiating an operational state of high-speed SerDes cable link interface;
  identifying flow-control packet Op codes available for monitoring at least one link channel in the high-speed SerDes cable link;
  transmitting a flow control signal from the local side physical layer to the remote side physical layer to monitor eye characteristics for each link channel;
  transferring eye characteristic data for each link channel to the local side physical layer; and
  processing the eye characteristic data at the local side physical layer to generate equalization setting adjustments for an individual link channel in the high-speed SerDes cable link where said eye characteristic data indicates interference in said individual link channel.

14. The program storage device as set forth in claim 13, further including a step of modifying adaptive equalization settings in accordance with the equalization setting adjustments.

15. The program storage device as set forth in claim 13, wherein the step of processing includes adjusting at least one of a power level for each link channel and a coefficient setting for each link channel.

16. The program storage device as set forth in claim 13 further comprising:
  monitoring bit error rate (BER) in the link channels used for data transfer, transferring bit error rate data to the local side physical layer and processing the BER data to further support said equalization setting adjustments.

17. The program storage device as set forth in claim 13, wherein the step of transmitting the flow control signal includes identifying the link channels to be monitored and a number of cycles the monitoring is carried out.

18. The program storage device as set forth in claim 13 further comprises:
  generating a setup packet that defines the interval in which link channels are to be monitored, and eye characteristics collected by the remote side physical layer, and the link channels for which the monitoring is to be conducted.

19. The program storage device as set forth in claim 18 wherein the step of identifying further includes generating an acknowledge packet within which the remote side physical layer provides acknowledgement to the local side physical layer that it will carry out the monitoring and collecting for the link channels identified.

20. The program storage device as set forth in claim 19 wherein the step of identifying further includes generating an eye characteristics packet within which the remote side physical layer includes the collected eye characteristics or eye characteristic data.

* * * * *